(12) United States Patent  
Schultz (10) Patent No.: US 8,708,057 B2
(45) Date of Patent: Apr. 29, 2014

(54) SCUFFLE HOE AND MULTIPURPOSE GARDEN TOOL

(76) Inventor: Gloria Jean Schultz, Desert Hot Springs, CA (US)

( * ) Notice: Subject to any disclaimer, the term of this patent is extended or adjusted under 35 U.S.C. 154(b) by 6 days.

(21) Appl. No.: 13/527,507

(22) Filed: Jun. 19, 2012

(65) Prior Publication Data

US 2012/0318543 A1     Dec. 20, 2012

Related U.S. Application Data

(63) Continuation-in-part of application No. 12/383,332, filed on Mar. 23, 2009, now abandoned.

(60) Provisional application No. 61/072,524, filed on Mar. 24, 2008.

(51) Int. Cl.
*A01B 1/00*     (2006.01)

(52) U.S. Cl.
USPC .......................................................... 172/376

(58) Field of Classification Search
USPC .................. 172/371–378, 380, 381; 294/53.5
See application file for complete search history.

(56) References Cited

U.S. PATENT DOCUMENTS

| | | | |
|---|---|---|---|
| 1,591,280 A | 7/1926 | Carr |
| 1,627,901 A | 5/1927 | Hills |
| 1,870,891 A | 4/1932 | Bristow et al. |
| 1,895,055 A | 1/1933 | Steinour et al. |
| 1,966,536 A | 7/1934 | Bevis |
| 2,662,461 A | 12/1953 | Upson |
| 2,741,969 A | 4/1956 | Strecker |
| 3,173,495 A | 3/1965 | Rosenkrantz |
| 5,495,896 A | 3/1996 | Bojar |

OTHER PUBLICATIONS

Office Action from U.S. Appl. No. 12/383 332 mailed Feb. 11, 2011, 5 pages.
Office Action from U.S. Appl. No. 12/383,332 mailed Apr. 13, 2010, 6 pages.
Final Office Action from U.S. Appl. No. 12/383,332 mailed Aug. 26, 2010, 6 pages.
Final Office Action from U.S. Appl. No. 12/383,332 mailed Oct. 19, 2011, 7 pages.

*Primary Examiner* — Robert Pezzuto
(74) *Attorney, Agent, or Firm* — Vincent H. Anderson (57) ABSTRACT

The tool is an optimized scuffle hoe that maximizes the efforts of the user in forward and backward motion, and that provides the functions of multiple garden tools, all-in-one. The tool includes a V-shaped head portion having an open interior with blades that are sharpened on both inside and outside. The V-shaped head is connected to a handle portion by curved arms that are free of 90 degree bends.

16 Claims, 7 Drawing Sheets

SCUFFLE HOE AND MULTIPURPOSE GARDEN TOOL

RELATED APPLICATIONS

This application is a Continuation-in-Part of, and claims the benefit of priority of U.S. patent application Ser. No. 12/383,332, filed Mar. 23, 2009 now abandoned, which in turn claims the benefit of priority of U.S. Provisional Patent Application No. 61/072,524 filed Mar. 24, 2008.

FIELD

Embodiments described are related generally to gardening tools, and embodiments described are more particularly related to an improved scuffle hoe.

COPYRIGHT NOTICE/PERMISSION

Portions of the disclosure of this patent document can contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2012, Gloria J. Schultz, All Rights Reserved.

BACKGROUND

Previously, the garden hoe has been associated with a laborious and sometimes painful task of weeding. Even so, the hoe has long been a useful tool in the yard and gardening arena. The original, blunt hoe design is also limited in its ability to work soil.

The scuffle hoe was invented as a possible alternative to some of the problems created by the original hoe. Some improvements include relieving strain on the back from lifting and pulling the original hoe. However, the scuffle hoe was limited in its design. Some problems can be seen in the examples cited as follows:

U.S. Pat. No. 5,046,254 to Russell (1991) presents several problems including the use of too many parts. The drawbacks of too many parts include high cost of manufacture and higher probability of tool failure. The cutting blade is only on the front, limiting the action of the tool to forward motion. There are several notches in the blade, making sharpening an arduous task. The handle is shaped so that the force is directed above the blade rather than into the blade. This creates a top-heavy effect, and renders the tool ineffective. Its overall use is limited in function.

U.S. Pat. No. 2,011,062 to Masamitsu (1935), though simple in construction, has flaws in the blade design. The solid blade doesn't allow user to see where the tool is working Limited visibility can result in roots of vital plants being cut. For safety, a user may need to hand-pick weeds growing near other plants.

U.S. Pat. No. 1,895,055 to Steinour (1933) uses a serrated edge, which is difficult to sharpen. Serrated edges tend to get caught in organic matter such as roots and stalks. The blade in this example also is sharpened only on one side. The only cutting action would be in a forward motion. Overall use is limited.

U.S. Pat. No. 1,777,029 to Bradford (1930) uses too many parts. It has some blade surface for cutting in pulling motion, but the scope is limited. Having the reverse blades only on the sides makes working the soil awkward. Such construction misses the focal area being worked by the forward blades. Again, the flat blade provides limited visibility as it works beneath the soil.

Others, including U.S. Pat. No. 5,495,896 to Bojar, suffer from similar deficiencies.

BRIEF DESCRIPTION OF THE DRAWINGS

The following description includes discussion of figures having illustrations given by way of example of implementations of embodiments described. The drawings should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

Descriptions of certain details and embodiments follow, including a description of the figures, which can depict some or all of the embodiments described below, as well as discussing other potential embodiments or implementations of the inventive concepts presented herein.

Reference Numerals
- 11 head portion
- 12 V-shaped blade
- 13 outer or forward facing blades
- 14 inner or backward facing blades
- 15 side curvature
- 16 foothold
- 17 fastener or attachment to handle 18 ground level
19 plane of handle
20 opening of the head portion
21 handle portion
22 curved interface to V-shaped portion
24 start of curve on outer edge
26 start of curve on inner edge
28 curve of connection from arm portion to V-shaped blade
30 inner arc
32 outer arc
34 V-shaped blade with notch

DETAILED DESCRIPTION

As described herein, a garden tool includes a tool head with a double-sided blade, and arms that curve up to a handle portion without 90 degree curves. The lack of 90 degree curves can reduce the stress points of the garden tool, improving usability, ergonomics, and effectiveness of the tool. The garden tool can be used in gardening and landscaping. The improved blade design can be used as a weeder, an edger, a furrower, and more.

Figure 1:
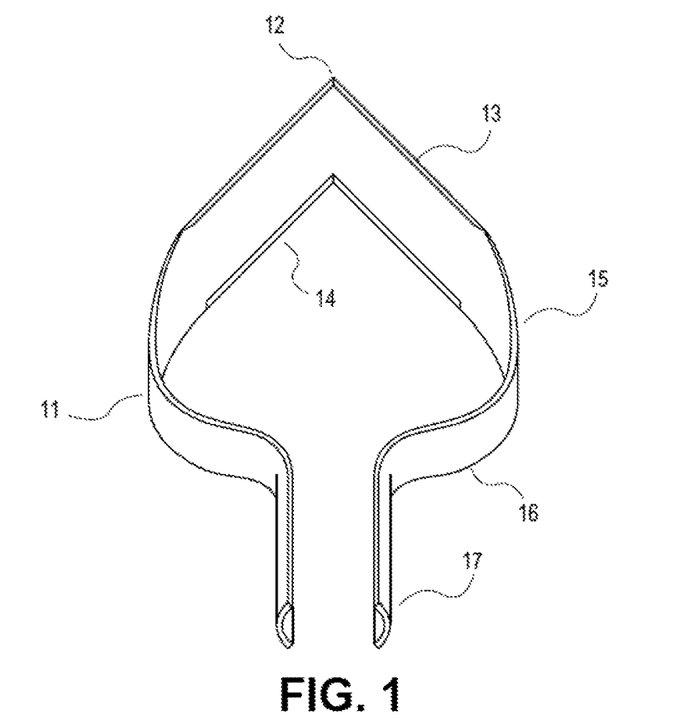
FIG. 1 is an aerial view of the head portion, constructed in accordance with the invention and showing the attachment to the lower end of the handle portion.

FIG. 1 is an aerial view of the head portion, constructed in accordance with the invention and showing the attachment to the lower end of the handle portion. As seen in the aerial view, head portion 11 is constructed in accordance with the invention. The forward portion 12 is in a V-shape or curved with outer blades 13, and inner blades 14. These may be sharpened, or merely thinned to facilitate a cutting or leveling action when this embodiment is pushed or pulled along the ground. The strip of metal comprising the head portion 11 curves in such a way 15 to ensure materials passing through the open portion of the embodiment are distributed evenly. Above the curve, a flat section 16 may be included where the user's foot may be placed for added force, if needed. The head portion 11 is fastened to the handle portion 18, which may be employed with bolts 17 or other methods befitting high standards of construction.

Figure 2:
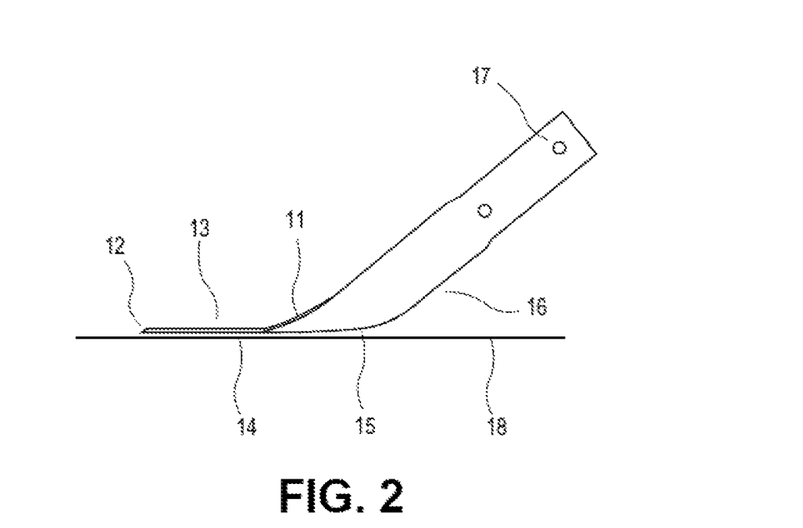
FIG. 2 is a perspective left-side view of the scuffle hoe of FIG. 1.

FIG. 2 is a perspective left-side view of the scuffle hoe of FIG. 1. From the left-side view, head portion 11 and fastener 17 are seen. Fastener 17 connects to handle portion 21 (not shown). This view shows the probable angle from the ground level 18 during normal standing use.

Figure 3:
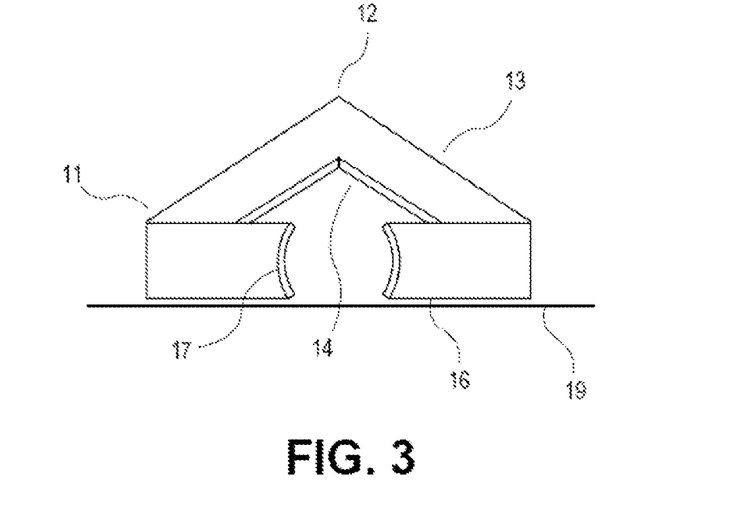
FIG. 3 is a perspective plane-of-handle view of the scuffle hoe of FIG. 1.

FIG. 3 is a perspective plane-of-handle view of the scuffle hoe of FIG. 1. This perspective view further demonstrates one embodiment of the viewpoint of FIG. 1.

Figure 4:
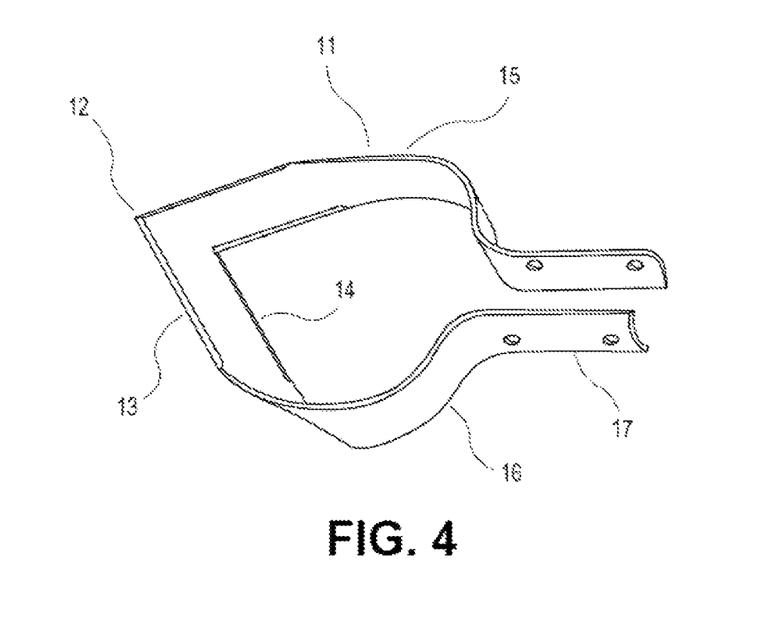
FIG. 4 is an aerial side-angle view of the scuffle hoe of FIG. 1.

FIG. 4 is an aerial side-angle view of the scuffle hoe of FIG. 1. The side-view further demonstrates one embodiment of the viewpoint of FIG. 1.

As described herein with respect to the garden tool, in one embodiment there is a central piercing point and two cutting edges diverging from the point. The blades diverging from the point are used to cut in a thrusting and pulling motion. The angle of the blades from the piercing point outward may be angled at approximately 90 degrees.

By sharpening or thinning both the outer and the inner portions of the V-shaped or curved blade a cutting action is created when the user pushes forward and pulls back during use. This forward and backward ability optimizes the user's efforts, lessening the amount of time and work required to complete tasks. The shape also facilitates other functions including but not limited to edging, leveling of dirt and gravel, spading, cultivating, furrowing, and de-icing.

The garden tool as shown and described herein can be implemented in various sizes including a long-handled device for use while standing, as well as a hand-held size. A post or ledge may also be added on the head portion of a long handled version of the scuffle hoe to allow the user to use foot pressure for further effectiveness. The lightweight, open, and ergonomic design makes the tool easier to use than other tools. Lifting and thrusting is basically eliminated because of the push/pull ability, making the use of the tool easier on the body. The open design eliminates the self defeating drag and resistance of solid tools which stress the body. The open or hollow interior also allows the tool to be placed over and around plants.

Because of the design, the tool is lighter in weight than most similar tools. This open design uses less raw material and labor to manufacture, especially when made with the 90 degree angle which produces the maximum number of blades per raw material product. Because of both the open design and light weight, the tool can be shipped more economically, more tools per container. One major advantage of this is the fuel savings.

The tool may be made from a variety of materials, but performs best when made of tempered steel or other material that is hardy and suitable for working through rock, gravel, compacted dirt, ice, or other elements. New plastics are being developed that will also be strong enough for use in both the head and handle portions.

The ease with which this invention is used brings a new era of garden and landscape enjoyment to the user. The tool will take the gardening and landscaping tasks from what were once backbreaking and labor intensive drudgery to an experience which is enjoyable and rewarding. The parallel operation of the tool, along with the lightweight, open, and ergonomic design will help to maintain the safety and health of the operator because of the ease of use.

The time saved due to the innovative design and operation, V-shaped or curved, sharpened double-sided blade, open interior, and curved arms is significant and is a value added to quality of life.

The tool may be made as a one piece blade or made with multiple parts welded together. The one piece blade is most efficient to manufacture and use, with no moving parts to break or wear out.

The handle portion may be constructed from any suitable handle material and shape including but limited to metal, fiberglass, wood, plastic, rubber, or composite materials. The handle portion may also be smooth or textured, of varied widths or diameters, and of varied lengths including one piece or expandable sections.

The head or blade portion may be attached to the handle portion with any method well known in the art of attaching to a tool including but not limited to nuts and bolts, rivets, screws, pins, glue or other adhesive. The head portion may also be made to include as a part of the head a tubular section into which the handle may be inserted.

Normal operation includes several functions. The primary use is as a scuffle hoe. With the head portion 11 level with the ground 18 the garden tool is pushed forward with a cutting action and pulled back providing more cutting action. This is useful in clearing weeds, even very thick ones, as well as leveling mounds of dirt or gravel. The side curvature 15 serves to gather or "scoop" materials and distribute them evenly on the ground or give a quick toss to the debris pile. Additionally, the side curvature 15 reduces stress points that prevent the transfer of force from the handle to the blade portion. For thicker weeds or harder dirt, the user's foot may be placed on the top portion 16 of the head for added force. This top portion may include a foot press on some models.

The tool may be inverted to provide added uses. Inverted, the garden tool can clear small concise areas with the V-tip 12, which is useful in clearing areas around plants and avoiding roots, as well as wider strips by using the blade 13 flush with ground level 18. The V-tip can further be inverted and used for furrowing and edging.

The entire combination of the blade shape comes in handy for leveling large mounds of dirt or other material. By placing the plane of the handle 19 perpendicular to the ground 18, both upright and inverted, the head portion 11 scoops and pushes dirt and other materials. This is convenient as the user can level a mound of dirt and continue other functions, all with one tool.

The tool may be inverted to provide added uses including furrowing for irrigation and planting seeds. The multipurpose tool can also be used for ice removal. The open or hollow interior also allows the tool to be placed over and around plants.

The tool is useful in clearing weeds and unwanted plants. One advantage of the garden tool is that the tool can leave the bark or soil undisturbed while removing the unwanted plants.

The tool may be inverted to provide added uses including furrowing for irrigation and planting seeds. This may very well be the first garden hoe to be used in the construction and building trades.

The ability to have a variety of sizes from a hand held to long handled device adds to the usefulness. The tool may be used by persons of almost any age.

Thus, the reader will see that at least one embodiment of the garden tool described herein provides a more reliable, lightweight, ergonomically friendly, and economical device that can be used for multiple purposes by persons of almost any age.

The tool has a V-shaped head portion having an open interior with blades that are sharpened on both inside and outside edges, the ends of which blades curve upward toward each other and attach to a handle portion. The lightweight, open, and ergonomic design makes the tool easier to use than other tools.

By sharpening or thinning both the outer and the inner portions of the V-shaped blade, a cutting action is created when the user pushes forward and pulls back during use. This ability optimizes the user's efforts, lessening the amount of time and work required to complete tasks. The lifting and thrusting required by other tools can do damage to the body in the form of muscle, neck, and back strain. This is significantly reduced because of the push/pull ability of the new design, making the use of the tool easier on the body. The tool can also be used as an edger, furrower, de-icer, with multiple use in the construction trade.

Figure 5:
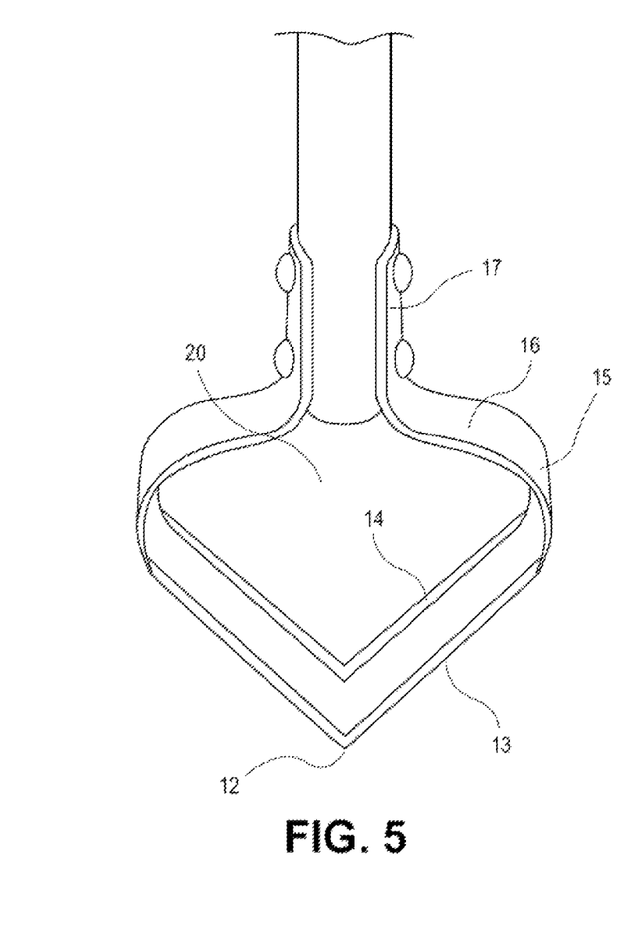
FIG. 5 is a top perspective view of one embodiment of a scuffle hoe with curved arm portions.

FIG. 5 is a top perspective view of one embodiment of a garden tool with curved arm portions. Handle portion 21 connects to fastener 17, which in one embodiment bends out to foothold 16. Foothold 16 is the top portion of arms 15 that curve up from the plane (the ground plane 18) of head portion 11. Head portion 11 includes V-shaped blade 12 with inward-facing blade edge 14 and outward-facing blade edge 13. Inward-facing blade edge 14 faces toward the opening of the head portion 20, through which debris can pass when the garden tool is used. As illustrated, blade 12 includes a pointed tip. In one embodiment, as described below with respect to FIG. 12, blade 12 includes a notched tip.

Figure 6:
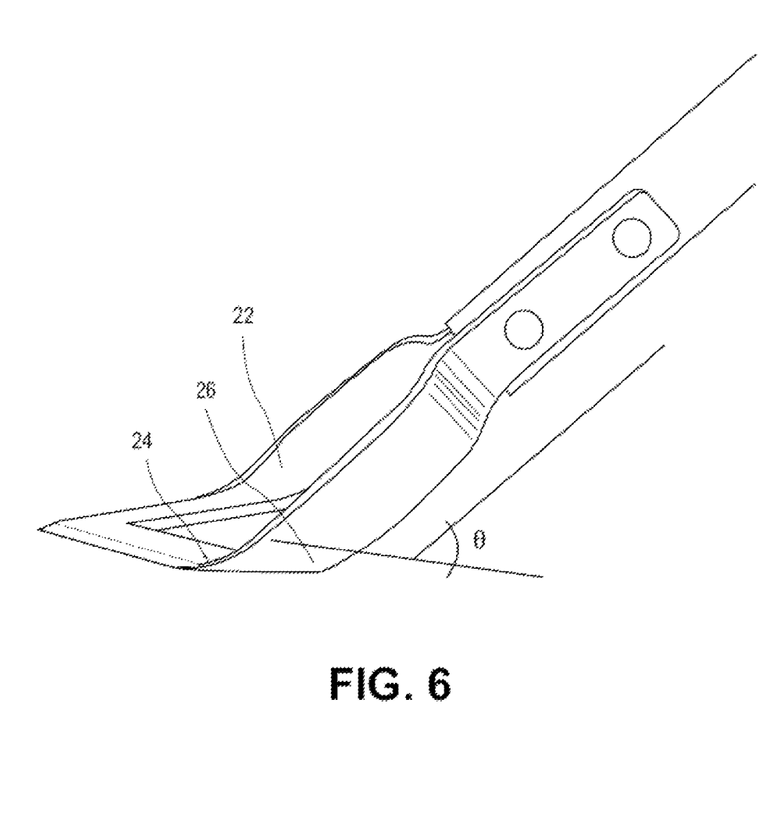
FIG. 6 is a side perspective view of one embodiment of the scuffle hoe with curved arm portions.

FIG. 6 is a side perspective view of one embodiment of the garden tool with curved arm portions. The side perspective view illustrates the curvature of the arm portions. On the far arm, the inner curve of the arm from the blade is seen. In particular, the view identifies the curved interface 22 of the arm to the V-shaped blade portion. Interface 22 transitions the strip constituting the blade portion from ground plane 18 up to a curve in plane 19 of the handle portion.

For another perspective of that curve, consider the near arm, where the outer surface of the arm is seen instead of the inner curve. Outward-facing blade edge 13 continues in a continuous curve, beginning with start of the curve on the outer edge 24. Similarly, inward-facing blade edge 14 continues in a continuous curve up to arm 15 beginning with start of the curve on the inner edge 26. It will be observed how the continuous curves interface up and around to the plane 19 of the handle without 90 degree angles or other discrete bends (i.e., a bend at a measurable angle, as opposed to a continuous curve). Rather, there is a more elliptical curvature, as described more specifically below with respect to FIG. 8.

It will be observed that the blade portion can be coplanar with plane of the ground level 18. When it is coplanar with ground level 18, the plane 19 of handle portion 21 intersects plane 18 at an angle, labeled as θ. θ can be an angle selected for ergonomic comfort of the user of the garden tool. Basing the tool design on the average height of American men and women, the angle θ can be somewhere between approximately 37-39 degrees. However, it will be understood that other angles could be used. For individuals of different height, and for different purposes for the tool, the angle θ can be made to be somewhere between about 30 and 50 degrees. However, angles in the range of 35-45 degrees will probably be best suited for most applications.

In contrast to the angle θ that provides good ergonomic comfort and ease of use of the tool described herein, the inventor has noticed that the discrete bends of other tools, and in particular the 90 degree bends, make the other tools difficult to use. The angle between the handle and the ground level in other tools becomes much lower than the described angle θ, which requires the user to bend to use the tool, which stresses the back, shoulder, wrists, elbows, hips, knees, and so forth. When such tools are held to have a better angle, the blade does not engage properly with the ground, and the other tools become extremely difficult or impossible to push along.

Figure 7:
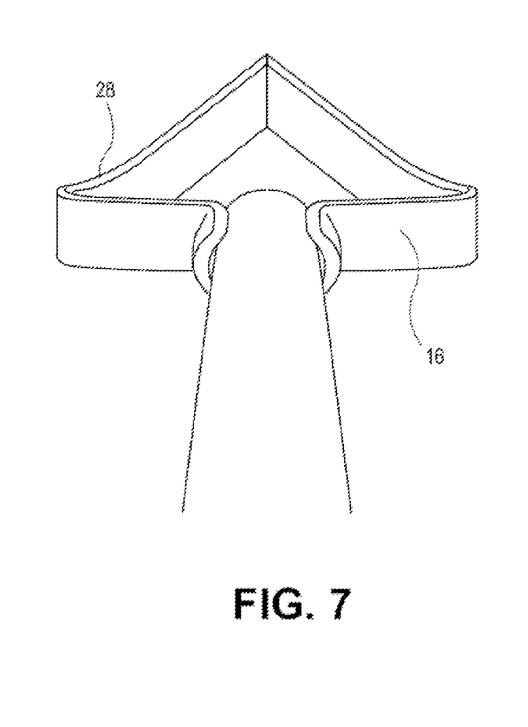
FIG. 7 is a perspective view from the top of the handle in one embodiment of the scuffle hoe, illustrating the curvature of the arm portions.

FIG. 7 is a perspective view from the top of the handle in one embodiment of the garden tool, illustrating the curvature of the arm portions. The curvature of the connection between the arm portion and the V-shaped blade 28 is better seen in FIG. 7. It will be understood that the perspective illustrated in FIG. 3 was simplified to illustrate the plane of the handle 19 and the foothold 16. As shown here, foothold 16 is still clearly seen, but the curvature 28 is more clearly visible. Curvature 28 is really just a top perspective of the curvature illustrated in the start of curve 24 of the outward-facing blade edge 13 of the blade portion.

Figure 8:
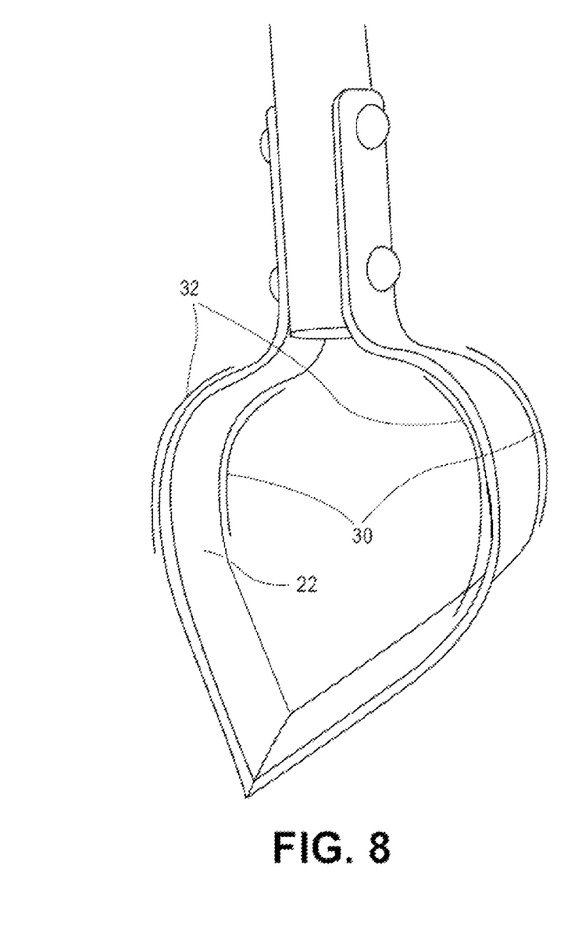
FIG. 8 is a perspective view of one embodiment of the scuffle hoe, illustrating the difference between the outer and inner arcs of the arm portions.

FIG. 8 is a perspective view of one embodiment of the garden tool, illustrating the difference between the outer and inner arcs of the arm portions. As seen in FIG. 6, the outward-facing blade edge 13 curves up through 24 into arm portion 15, and inward-facing blade edge 14 curves up through 26 into arm portion 15. The combination of both of those curves as seen on the inside of the arm portion is interface 22. FIG. 8 illustrates a different perspective of the same embodiment of the tool shown in FIG. 6, and so looks at interface 22 from a different perspective.

As described above, arm portion 15 connects to the blade portion 12 through interface 22, and at an angle that is less than 90 degrees between the plane of blade portion 12 and the plane of the handle portion 19. Thus, the arm portion includes an "inner arc" 30 and an "outer arc" 32, corresponding to the inward-facing blade edge and the outward-facing blade edge, respectively. In one embodiment, inner arc 30 has a tighter radius than outer arc 32. Thus, the arcs of the two sides (the two arms) of the tool form an elliptical region inside open region 20. The ellipse area by the two outer arcs 32 can be larger than the elliptical area formed by the two inner arcs 30.

One advantage to the arcs is the improved transfer of force applied to the handle portion over comparable tools that use 90 degree (or some other discrete angle) bends. In one embodiment there are no flat surfaces on the arm portions from where they connect to the foothold down to where they interface with the blade portion. This is one embodiment of an understanding of a continuous curve. Another advantage of the two arcs of different radius (or moment, considering the arcs to be elliptical rather than circular), is that the tool can be used to scoop and spread material, because when held at the right angle the tool allows for the momentary capture of material.

Figure 9:
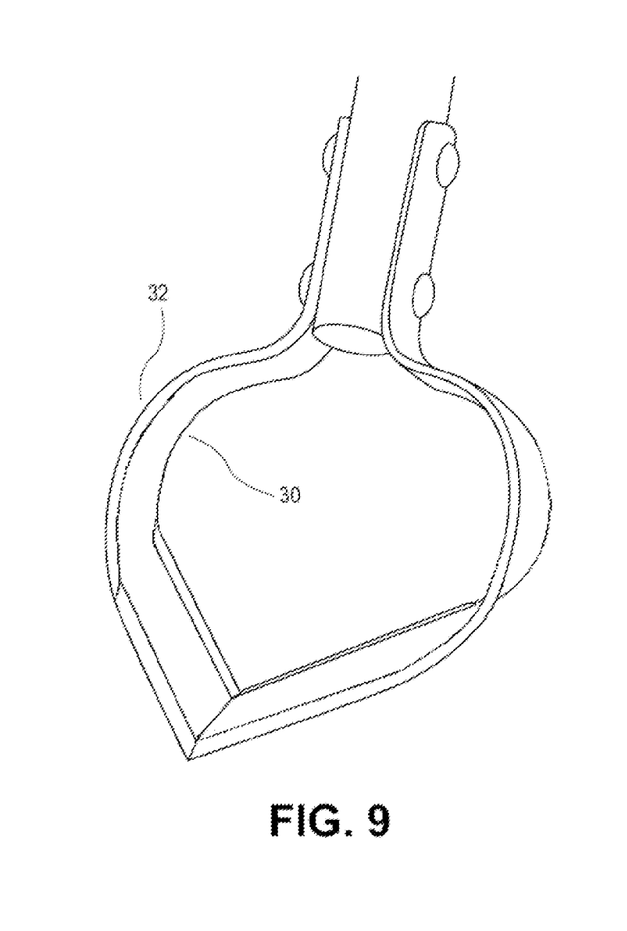
FIG. 9 is a perspective view of one embodiment of the scuffle hoe showing the curve of the arm portions from the front of the scuffle hoe.

FIG. 9 is a perspective view of one embodiment of the garden tool showing the curve of the arm portions from the front of the garden tool. As seen from another slightly different perspective from towards the front of the tool (i.e., looking at the tool where the outward-facing blade edge is closest to the observer). This perspective illustrates the curvature of inner arc 30 and outer arc 32.

Figure 10:
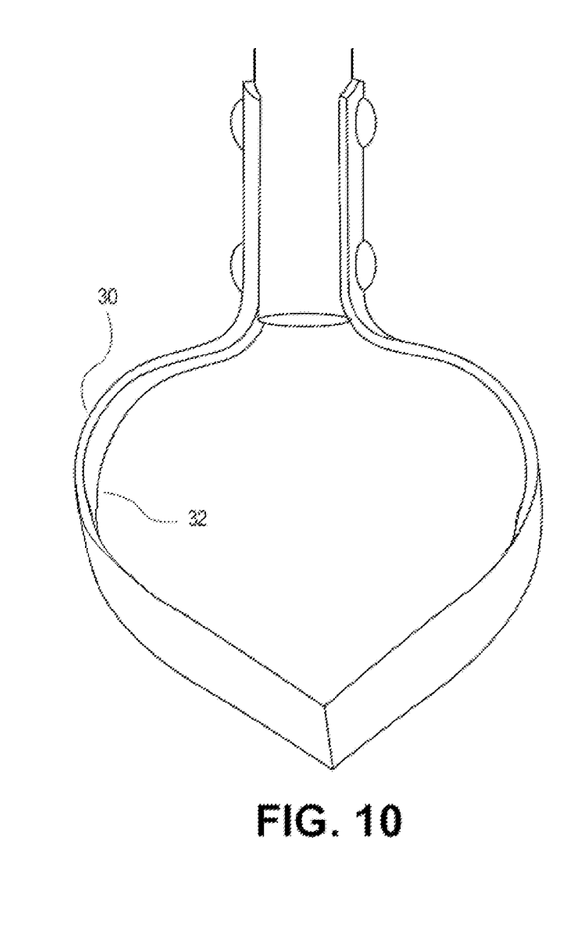
FIG. 10 is a perspective view of one embodiment of the scuffle hoe showing the curve of the arm portions from the back of the scuffle hoe.

FIG. 10 is a perspective view of one embodiment of the garden tool showing the curve of the arm portions from the back of the garden tool. This perspective is from towards the back of the garden tool (i.e., looking at the back of the tool where the inward-facing blade edge is closest to the observer). From the back perspective, it is also seen how inner arc 30 and outer arc 32 are continuously curved, without discrete angles or bends in the arm portions. The perspective from the back also illustrates how the curve of outer arc 32 is longer than inner arc 30, meaning it has a larger radius or moment.

Figure 11:
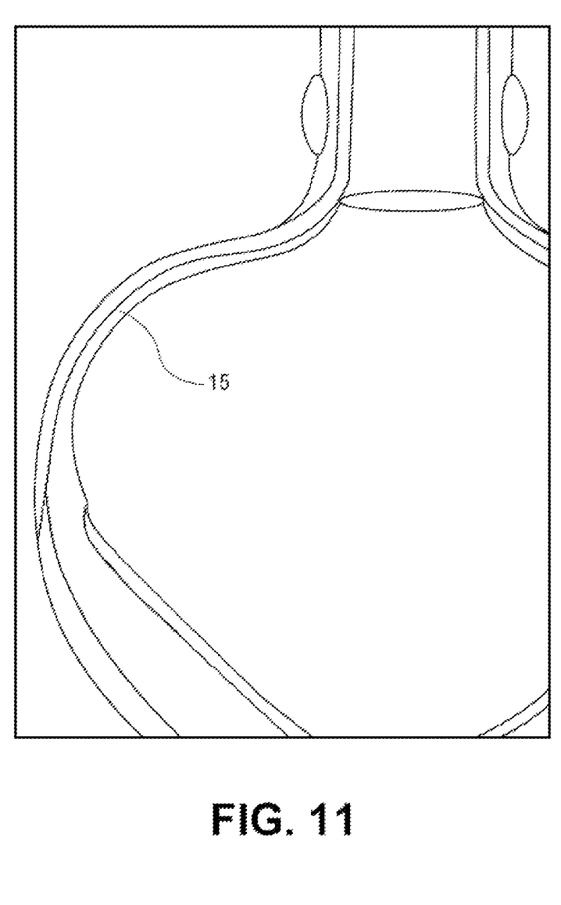
FIG. 11 is a close-up perspective view of one embodiment of the scuffle hoe showing the curvature of the arm portion.

FIG. 11 is a close-up perspective view of one embodiment of the garden tool showing the curvature of the arm portion. Arm portion 15 can be seen from nearly straight on the outward-ward facing edge 13. Again, this portion illustrates the lack of discrete angles or bends in arm portion 15, as well as illustrating the curvature of inner arc 30 and outer arc 32.

Figure 12:
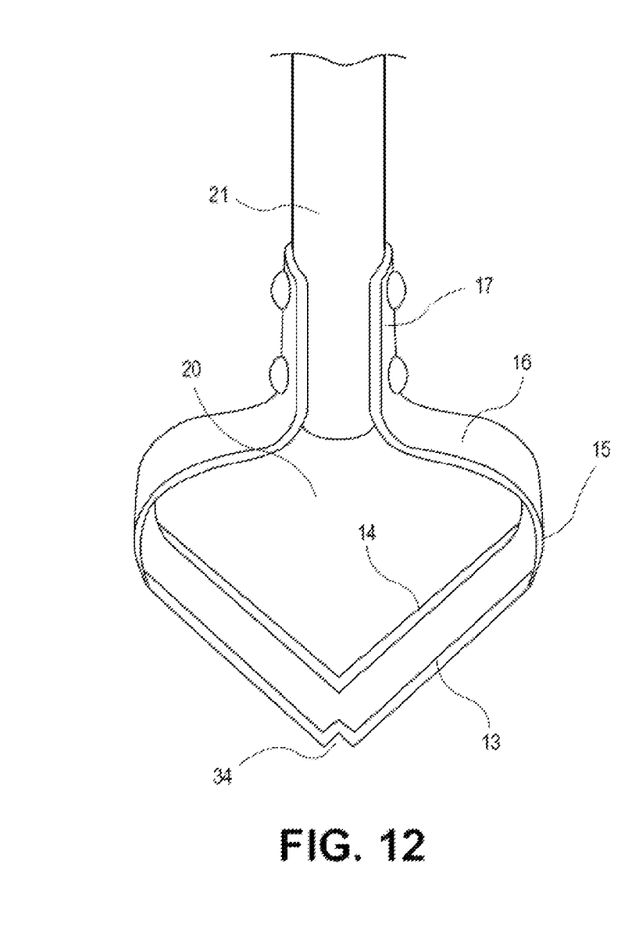
FIG. 12 is a perspective view of one embodiment of the scuffle hoe with a notch in the tool portion.

FIG. 12 is a perspective view of one embodiment of the garden tool with a notch in the tool portion. Handle portion 21 connects to fastener 17, which in one embodiment curves out to foothold 16. Foothold 16 is the top portion of arms 15 that curve up from the plane (the ground plane 18) of head portion 11. Head portion 11 includes V-shaped blade 12 with inward-facing blade edge 14 and outward-facing blade edge 13. Inward-facing blade edge 14 faces toward the opening of the head portion 20, through which debris can pass when the garden tool is used. V-shaped blade 34 includes a notch instead of a pointed tip. The shape and size of the notch are variable, and can be changed from one implementation to another. For purposes of example, and not by way of limitation, the notch can itself be V-shaped (a V in the opposite direction of the V shape of the blade), U-shaped, a semicircle, an arc, or another shape. The depth of the notch can also be variable. In one embodiment, the depth of the notch is between approximately 1/10 to 1/4 the width of the blade. Other depth of notch can also be used. In one embodiment, the pointed tip is replaced with a flattened portion that could be as wide as the notch shown, but simply be flat rather than notching back into the blade.

Figure 13A:
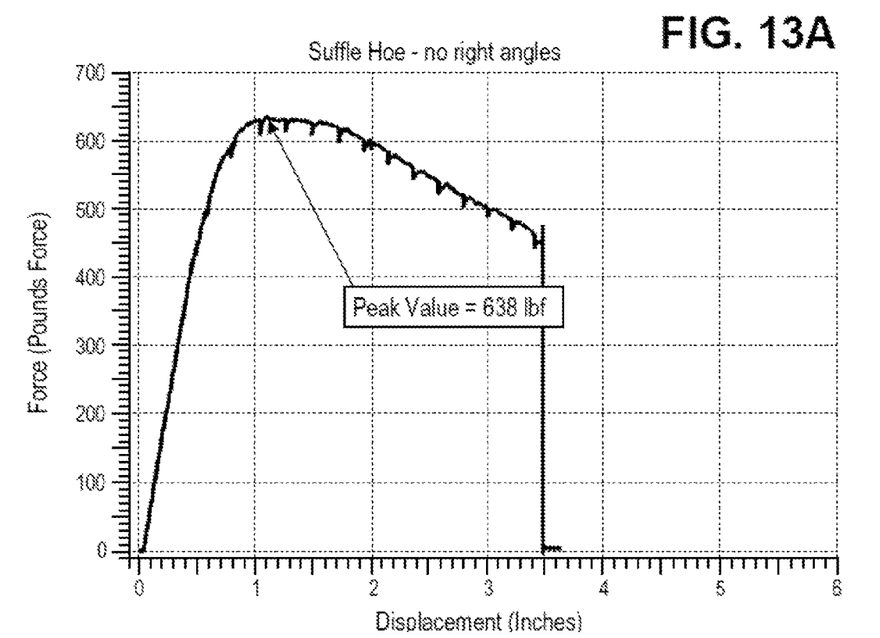
FIGS. 13A-13B illustrate graphs showing failure comparison of the scuffle hoe (FIG. 13A) against a hoe design with right angles in the tool (FIG. 13B).
Figure 13B:
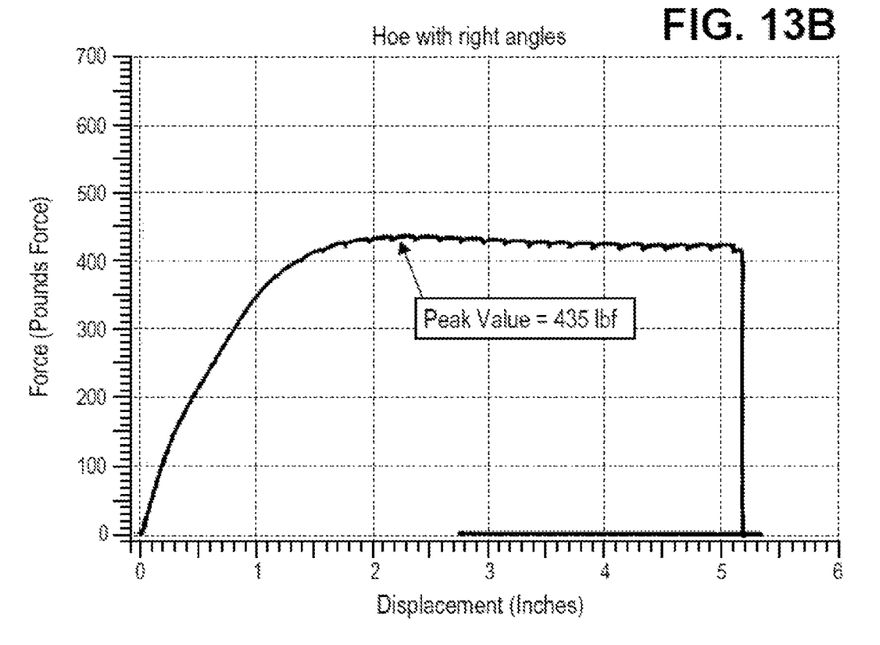

FIGS. 13A-13B illustrate graphs showing failure comparison of the garden tool (FIG. 13A) against a hoe design with right angles in the tool (FIG. 13B). As shown, the two different tools were subjected to a stress test. The stress test determined an amount of force that could be applied by driving the tool "straight." Driving the tool straight involves pushing against the handle with the tip of the tool secured. In use on the ground, the tool can be used where the plane of the blade is flush or nearly flush with the ground. Thus, the blade can be said to be coplanar with the ground. For purposes of testing, both tools were mounted with the plane of the blade being at 90 degrees (i.e., the blade of the tool was pointed straight up). With the blade portions fixed in place, force was applied to the handle to drive the blade along the plane it was in (i.e., straight up) until failure of the tool.

In FIG. 13A, the tool without right angles in the connection from the blade to the handle (i.e., the tool described herein) sustained more than 630 pounds of force prior to failure. In FIG. 13B, the tool with right angles was constructed of the same tempered steel used for the tool described herein. That tool only withstood approximately 430 pounds of force prior to failure. The tool described herein failed by "folding," where the head bent in a way that the tool could no longer be driven forward. The comparison tool had the blade break. Thus, as described herein with the continuous curves, the tool can withstand a greater degree of force than the tool with discrete bends, such as 90 degree bends.

The stress test proved that the tool with continuous curves in the arms withstood approximately 48% more forces than the tool with discrete bends. The inventor believes that the demonstration of the difference in the amount of force that can be withstood is due to the fact that the discrete bends create pressure points in the material of the head. Consider that the blade of the comparison tool broke, whereas the tool described herein withstood an amount of force sufficient to bend the steel used in the embodiment tested. The lack of stress points prevented breakdown of the steel, whereas in the comparison tool the steel broke.

It will be understood from the testing comparison that the tool described herein is better at transferring force applied to the handle to the tip of the blade portion. It is believed that the comparison tool broke due to the lack of transferring the force to the tip of the tool, but instead creating a stress points in the tool head, unlike the tool described herein.

Besides what is described herein, various modifications can be made to the disclosed embodiments and implementations without departing from their scope. Therefore, the illustrations and examples herein should be construed in an illustrative, and not a restrictive sense.

What is claimed is:

1. A scuffle hoe comprising:
    a handle portion;
    a head with a blade portion, the blade portion including a beveled, double sided V-shaped blade sharpened on both the inside and outside edges and having an open V-shaped interior to allow push and pull scuffle motion of the blade portion by application of force on the handle portion; and
    arm portions to connect the blade portion to the handle portion, each arm portion curved and rounded between the blade portion and the handle portion to transfer force applied at the handle portion generated by the scuffle motion directly to the blade portion without introducing stress points from right-angles in the arms between the head and the handle portion, each arm portion including a curved twist to connect the respective arm portion to the blade portion, and extending in a continuous curve without straight edges from the twist up to an upper part of the arm portion that connects to the handle portion.

2. The scuffle hoe of claim 1, wherein the blade portion is a single piece of metal, or multiple pieces welded together.

3. The scuffle hoe of claim 1, wherein the V-shaped blade is planar, and wherein the handle portion intersects a plane of the V-shaped blade at an angle of approximately between 35 to 45 degrees.

4. The scuffle hoe of claim 3, wherein the handle portion intersects the plane of the V-shaped blade at an angle of approximately between 37 to 39 degrees.

5. The scuffle hoe of claim 1, wherein the V-shaped blade further includes a point at a tip of the head on an outer edge of the V-shaped blade.

6. The scuffle hoe of claim 1, wherein the V-shaped blade further includes a notch at a tip of the head on an outer edge of the V-shaped blade.

7. An apparatus comprising
a tool portion including first and second legs extending from an apex at approximately a 90 degree angle,
wherein the first and second legs form
a blade portion including a V-shaped blade sharpened on both the inside and outside edges with an open V-shaped interior to allow push and pull scuffle motion of the blade portion by application of force on a handle connected to the tool portion, and
arm portions extending up from a plane of the blade portion, the arm portions to connect to the handle, the arm portions formed by ends of the first and second legs curved toward each other to attach to the handle, the arm portions to transfer force applied to the handle generated by the scuffle motion directly to the blade portion without introducing stress points from right-angles in the arms between the handle and the tool portion, each arm portion including a curved twist to connect the respective arm portion to the blade portion, and extending in a continuous curve without straight edges from the twist up to an upper part of the arm portion that connects to the handle and without right angles along the arm portion from the blade portion up to the upper part that connects to the handle.

8. The apparatus of claim 7, the blade portion further comprising a V-shaped member that includes blades formed into a double-sided V-shape including sharpened, straight, beveled, knife-like edges with an open interior.

9. The apparatus of claim 7, wherein the tool portion is formed of a single piece blade.

10. The apparatus of claim 7, wherein the scuffle motion comprises a pushing or pulling motion of the tool to weed, edge, cultivate, and groom a working surface.

11. The apparatus of claim 7, wherein the arm portions include two continuous arms which curve up from the V-shaped blade portion, the two continuous arms further including flat portions to connect to the handle to allow application of additional force to the blade by a foot of a user, the curvature of the arms extending between the flat portions and the blade.

12. The apparatus of claim 7, wherein the tool portion is formed of a blade welded at the V-point.

13. The apparatus of claim 7, wherein the curvature of the blade and the angle of the handle connected to the blade allows ergonomic operation, transferring force on the handle to the apex of the blade.

14. The apparatus of claim 7, wherein the V-shaped blade is planar, and wherein the handle intersects a plane of the V-shaped blade at an angle of approximately between 35 to 45 degrees.

15. The apparatus of claim 14, wherein the handle intersects the plane of the V-shaped blade at an angle of approximately between 37 to 39 degrees.

16. The apparatus of claim 7, wherein the V-shaped blade further includes a notch at a tip of the blade portion on an outer edge of the V-shaped blade.

\* \* \* \* \*